(12) United States Patent
Ishibashi et al.

(10) Patent No.: US 6,366,340 B1
(45) Date of Patent: *Apr. 2, 2002

(54) ELECTRON EXPOSURE APPARATUS

(75) Inventors: Masayoshi Ishibashi; Seiji Heike; Tomihiro Hashizume, all of Hiki-gun; Yasuo Wada, Bunkyou-ku; Hiroshi Kajiyama, Kawasaki, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,942

(22) Filed: Jun. 5, 1998

Related U.S. Application Data

(63) Continuation-in-part of application No. 08/696,089, filed on Aug. 13, 1996.

(30) Foreign Application Priority Data

| Aug. 18, 1995 | (JP) | 7-210406 |
|---|---|---|
| Dec. 18, 1995 | (JP) | 7-328707 |
| Apr. 12, 1996 | (JP) | 8-90778 |
| Jun. 10, 1997 | (JP) | 9-151857 |
| Jun. 24, 1997 | (JP) | 9-166851 |

(51) Int. Cl.[7] .............. G03B 27/72; G03C 5/00
(52) U.S. Cl. ............. 355/69; 355/71; 430/296
(58) Field of Search .......... 355/69, 71; 310/309; 250/306, 307, 309, 311, 310, 300; 369/126; 430/5, 296

(56) References Cited

U.S. PATENT DOCUMENTS

| 5,049,461 A | * | 9/1991 | Arnett et al. .................. 430/5 |
| 5,150,392 A | * | 9/1992 | Hohn et al. ................. 250/306 |
| 5,431,055 A | * | 7/1995 | Takata et al. ............... 250/307 |
| 5,536,988 A | * | 7/1996 | Zhang et al. ............... 310/309 |
| 5,546,374 A | * | 8/1996 | Kuroda et al. ............. 250/306 |
| 5,546,375 A | * | 8/1996 | Shimada et al. ........... 369/126 |
| 5,666,190 A |   | 9/1997 | Quate et al. |
| 5,793,040 A | * | 8/1998 | Oguchi et al. ............. 250/306 |

OTHER PUBLICATIONS

Applied Physics Letters, vol. 66, No. 6, Feb. 6, 1995, "Fabrication of 0.1μm metal oxide semiconductor field–effect transistors with the atomic force microscope", S. C. Minne et al, pp. 703–705.

1997 Symposium on VLSI Technology, "Fabrication on 100nm pMOSFETs with Hybrid AFM/STM Lithography", Soh et al.

* cited by examiner

Primary Examiner—Russell Adams
Assistant Examiner—Peter B. Kim
(74) Attorney, Agent, or Firm—Mattingly, Stanger & Malur, P.C.

(57) ABSTRACT

To provide an electron exposure apparatus capable of providing high resolution and performing electron exposure at high speed, integrated tips are used. Only the tips provided at ends control distances between the tips and the surface of a wafer, and the tips used for electron exposure follow the wafer according to deformations of cantilevers, which occur due to the Coulomb force resultant from a voltage applied to each tip.

21 Claims, 11 Drawing Sheets

FIG. 3A
FIG. 3B
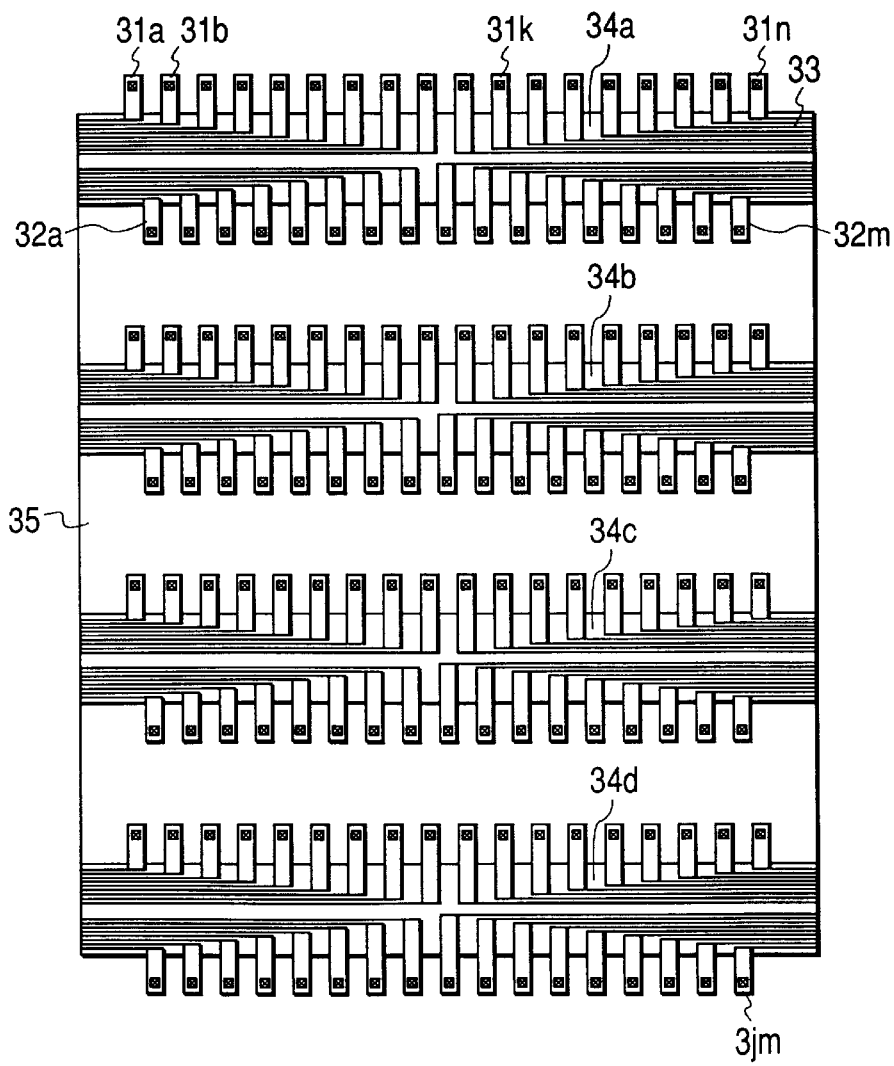
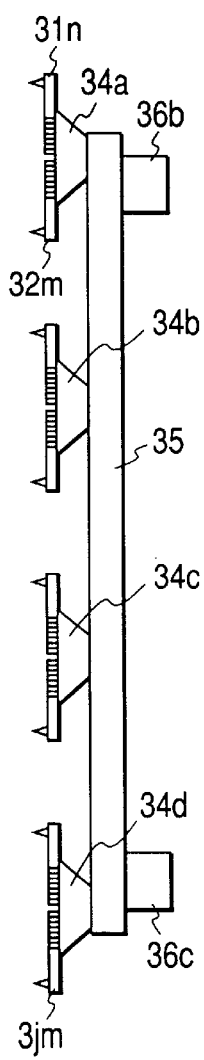

FIG. 9A
FIG. 9B
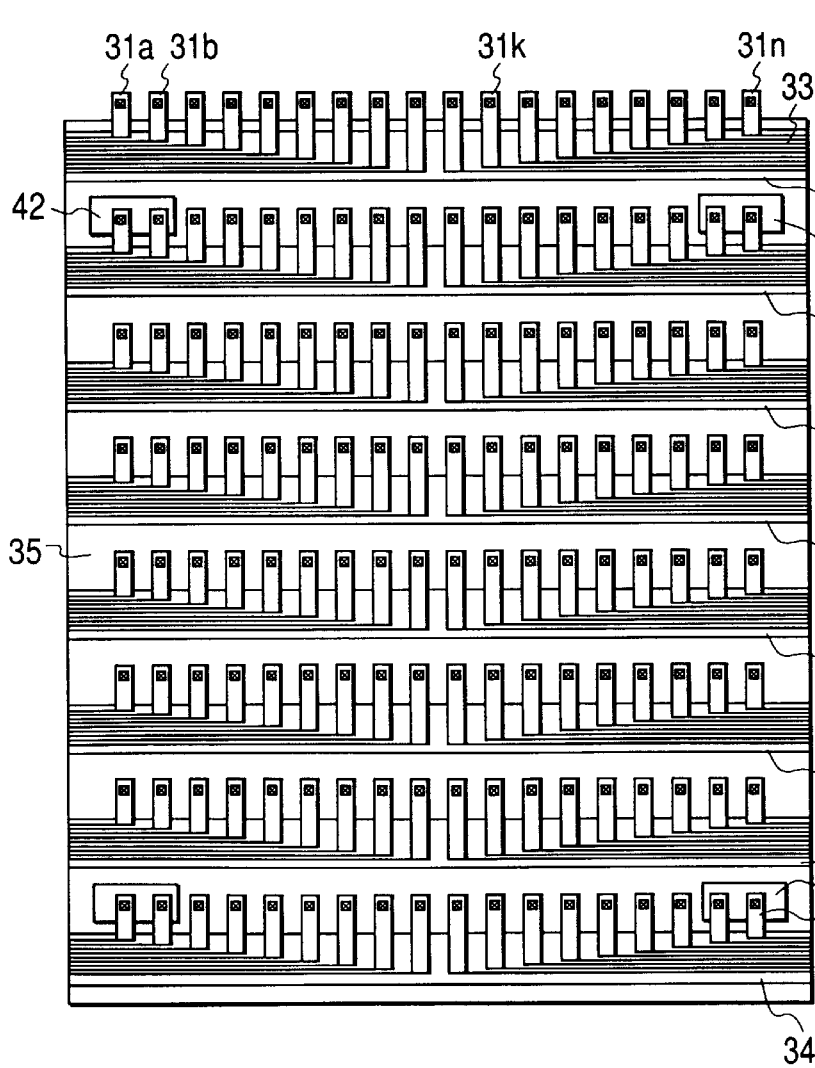
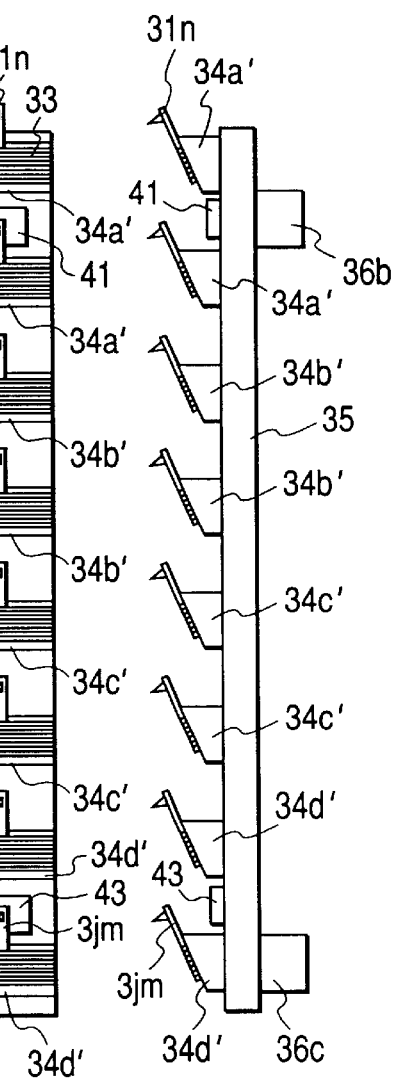

ELECTRON EXPOSURE APPARATUS

CROSS-REFERENCE TO RELATED APPLICATION

This application is a continuation-in-part of U.S. patent application Ser. No. 08/696,089 filed on Aug. 13, 1996, and the disclosure of which is incorporated herein by reference.

BACKGROUND OF THE INVENTION

1. Field of the Invention

The present invention relates to an electron exposure apparatus employed in a micro-fabrication technique using a scanning probe microscope.

2. Description of the Related Art

A nanometer-scale-fabrication technique is indispensable for fabricating higher integrated electronic device and higher densificated recording media. However, the minimum feature size of the electronic device is limited to about 100 nm by the wavelength of a light source and a lens material used in optical lithography. Further, the resolution margin in a master plate of a recording medium is expected to be smaller in the near future. A nanometer-scale-fabrication technique using a scanning probe microscope, such as described in, S. C. Minne et al., "Fabrication of 0.1 $\mu$m Metal Oxide Semiconductor Field-Effect Transistor" Appl. Phys. Lett. 66(6) 6 Feb. 6, 1995 pp. 703–705, or Hyongsok T. Soh et al., "Fabrication of 100 nm pMOSFETs with Hybrid AFM/STM Lithography" (1997 SYMPOSIUM ON VLSI TECHNOLOGY), is promising for fabricating nanometer-scale devices and recording media. In general, this method is performed by applying a voltage between tip and wafer, and the resolution is atomic level in principle.

Further, a lithography system having a plurality of cantilevers has been also proposed as disclosed in U.S. Pat. No. 5,666,190.

SUMMARY OF THE INVENTION

In the case of using the scanning probe microscope as an electron exposure apparatus, high speed scanning under the simultaneous use of a plurality of tips is effective as in a micro-fabricated device with integrated electrostatic actuators, which has been proposed in U.S. Pat. No. 5,666,190 or the parent application of the present application. On the one hand, however, this method needs to control two, i.e., exposure doses and wafer-to-tip distances with respect to respective tips. This method also requires not only their drivers but also a control system for generally controlling all of them, thereby leading to a complex apparatus.

The present invention has taken note of the fact that the Coulomb forces, which are generated by the exposure current, are large enough to bend the cantilevers and to allow the respective tips to contact the wafer surface. Namely, the distance between the tip group and wafer surface is roughly controlled at the start of the electron exposure. In this case, each side of the tip group may be set to have a suitable wafer-to-tip distance. If done in this way, then all the tips can have suitable wafer-to-tip distances within a range of a given dispersion incident to the fabrication of the tip group. After the electron exposure has been started, the wafer-to-tip distances at each side of the tip group are monitored and controlled to keep the distance determined at the start of the electron exposure.

In other words, in the present invention, electron exposure is carried out while each side of a tip group maintains a suitable wafer-to-tip distance determined at the start of the electron exposure. In doing so, individual tips automatically bend along the surface of the wafer, even if the surface has micro-roughness, by the Coulomb force supplied from exposure current. Thus, wafer-to-tip distance control is not required on each individual tip during electron exposure. Of course, the exposure-current control is required for each individual tip.

Typical ones of various embodiments of the present invention have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3A is a plan view showing other embodiments of the cantilevers of the electron exposure apparatus of the present invention and its holder as seen from the ventral sides of the cantilevers;

FIG. 3B is a side view illustrating the embodiments shown in FIG. 3A;

FIG. 9A is a plan view showing other modifications of the cantilevers and its holder shown in FIG. 3A as seen from the ventral sides of the cantilevers;

FIG. 9B is a side view illustrating the modifications shown in FIG. 9A;

DESCRIPTION OF THE PREFERRED EMBODIMENT

[Embodiment I]

In the present embodiment, an embodiment of an electron exposure apparatus wherein a plate wafer is moved or displaced in a plane direction thereof to draw an image or perform electron exposure, will be described with reference to FIGS. 1 and 2.

Figure 1:
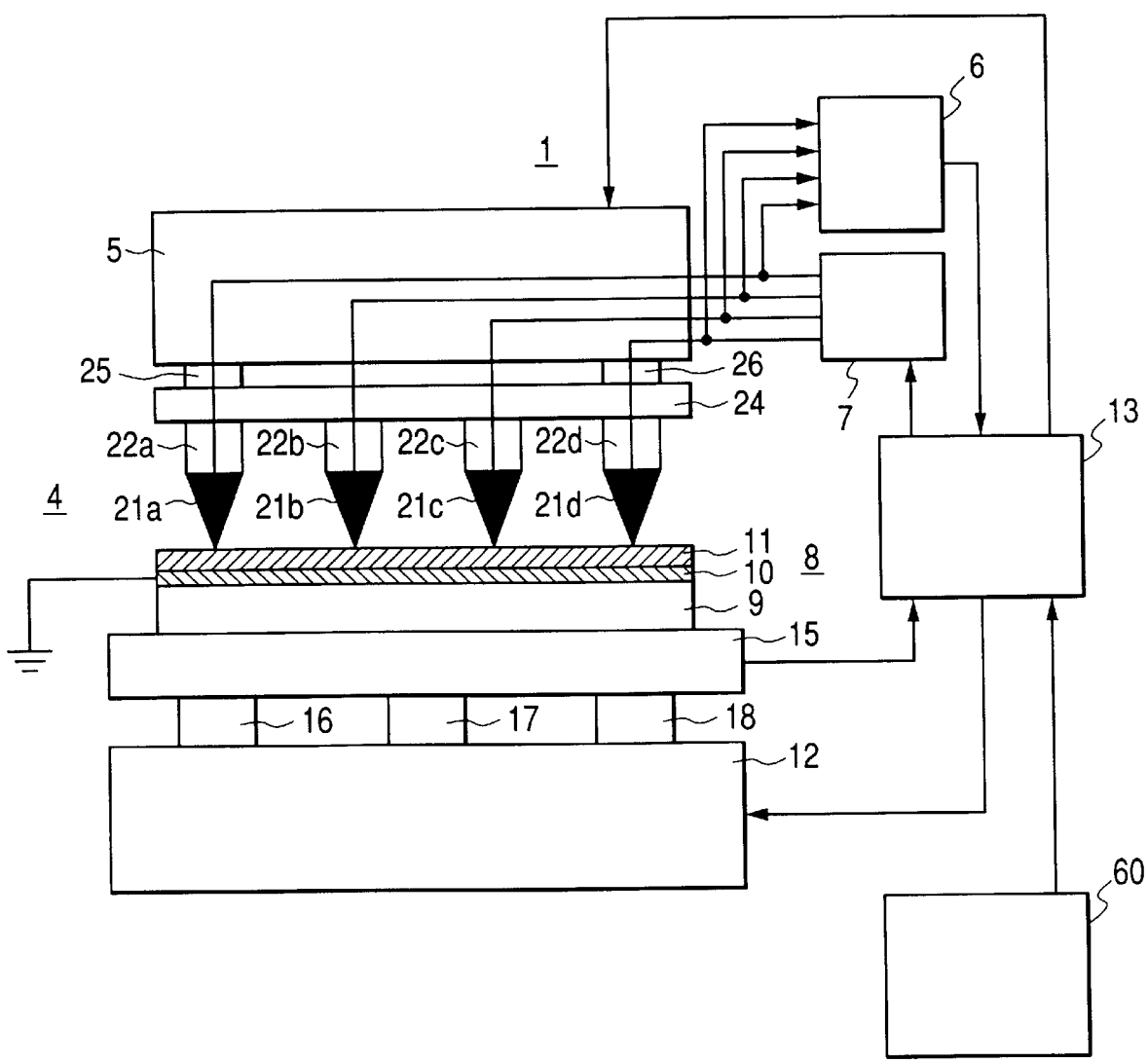
FIG. 1 is a block diagram showing the concept of a configuration of an embodiment according to an electron exposure apparatus of the present invention.

FIG. 1 is a block diagram showing the concept of a configuration of a first embodiment of an electron exposure apparatus of the present invention. A micro-fabrication image-drawing or electron-exposure head 1 comprises a micro-fabrication electron exposure unit 4 and a slope or inclination corrector 5. The micro-fabrication electron exposure unit 4 comprises conductive springs 22a, 22b, 22c and 22d respectively used as cantilevers and conductive probes or tips 21a, 21b, 21c and 21d respectively connected to the springs, and a holder 24 for collectively holding these. The holder 24 is coupled to the slope corrector 5 through piezo elements 25 and 26. The slope corrector 5 has the opposite side of a surface coupled to the piezo elements 25 and 26, which is held by an unillustrated electron exposure apparatus body. Further, the slope corrector 5 supplies a voltage to each of the piezo elements 25 and 26 in response to an inclination correction signal supplied from a drive and exposure controller 13 to be described later, to thereby correct the inclination of the holder 24 so that a line connecting the tips 21a and 21d at both ends to each other becomes parallel to the surface of a resist layer 11 of a wafer 8 to be subjected to electron exposure. A voltage application part 7 controls voltages to be applied to the tips 21a through 21d in response to a control signal supplied from the drive and exposure controller 13. In this case, the voltage application part 7 controls the voltages to be applied to the tips 21a through 21d so that they become suitable voltages respectively where the inclination of the holder 24 is corrected using the tips 21a and 21d provided at both ends, and electron exposure is performed by using the tips 21b and 21c. A current detector 6 detects each current applied to the resist layer 11 through the tips and feeds back its detected output to the drive and exposure controller 13. Upon execution of the inclination correction, the drive and exposure controller 13 supplies a suitable voltage to each of the tips 21a and 21d and controls voltages to be applied to the piezo elements 25 and 26 so that their currents become equal to one another. Upon execution of the electron exposure, the drive and exposure controller 13 controls the voltage to be applied to each of the tips 21b and 21c, i.e., the voltage application part 7 so that it becomes a current corresponding to a control signal associated with an electron-exposure pattern supplied from a pattern input part 60. Now consider a current to flow through the resist layer 11. When the resist layer 11 is high in insulation, the current results in a field emission current, whereas when the resist layer 11 is conductive, it results in a so-called "current". In the present invention, these will be defined as "current" without drawing a distinction between the two.

The drive and exposure controller 13 supplies a transfer or movement signal to a moving or transfer part 12 in response to the control signal supplied from the pattern input part 60. The transfer part 12 has one surface held by the unillustrated electron exposure apparatus body, and a surface different from the held surface thereof, which is provided with drive mechanisms 16, 17 and 18 for displacing a transfer stage 15 in X, Y and Z directions according to the transfer signal. Although the drive mechanisms have been shown by the blocks 16, 17 and 18 in a sense that they are triaxially driven in the X, Y and Z directions, those having configurations used in the form of arbitrary mechanisms such as a Pattern Aligner, etc. may be adopted. A displacement of the transfer stage 15 is measured by a high-resolution measuring device such as a laser interferometer or the like. The result of measurement thereof is fed back to the drive and exposure controller 13 where it is controlled precisely. The wafer 8 is mounted on the transfer stage 15.

Prior to the electron exposure, the transfer part 12 moves the transfer stage 15 in response to an approach signal supplied from the drive and exposure controller 13 until the tips 21a through 21d are placed in their corresponding predetermined positions by the Z-axis drive mechanism 18 with respect to the surface of the resist layer 11 of the wafer 8 to be subjected to the electron exposure, thereby allowing the resist layer 11 of the wafer 8 to approach the tips 21a through 21d. At this time, suitable voltages are applied to the tips 21a through 21d respectively. When a current detected from any of the tips has reached a predetermined value, its approach is stopped.

After the inclination correction has been performed, the transfer part 12 moves the transfer stage 15 on an X-Y surface through the X-axis drive mechanism 16 and the Y-axis drive mechanism 17 so that a pattern is drawn on the resist layer 11 of the wafer 8. In order that while the pattern is being drawn thereon, the magnitude of a current is monitored using the tips 21a and 21d located at both ends to thereby maintain the distance between the resist layer 11 and each tip as a suitable value, the transfer part 12 is controlled by the drive and exposure controller 13 so as to continue position control in a Z-axis direction.

The wafer 8 consists of a glass-made substrate 9, a conductive layer 10 formed by evaporating chromium onto the substrate 9 over a range of 20 nm to 100 nm in thickness, and a resist layer 11 (corresponding to a layer coated with a Negative-type resist (RD2100N; product of Hitachi Chemical Co., Ltd.) corresponding to, for example, an Azide/phenolic resin resist) having a thickness of about 100 nm. A resist employed in the resist layer 11 may be a resist composed of a mixture of a novolak resin and a photo-active compound, a chemically amplified resist or polymethyl methacrylate. The substrate 9 may use an arbitrary material to be processed, such as silicon, doped silicon or the like. When the doped silicon is used for the substrate 9, the conductive layer 10 may be omitted due to the conductivity of the substrate 9 itself. The conductive layer 10 is electrically grounded so that the current flows through the resist layer 11 according to the voltage applied to each tip. When the conductive substrate 9 is used, it may be directly grounded.

Figure 2A:
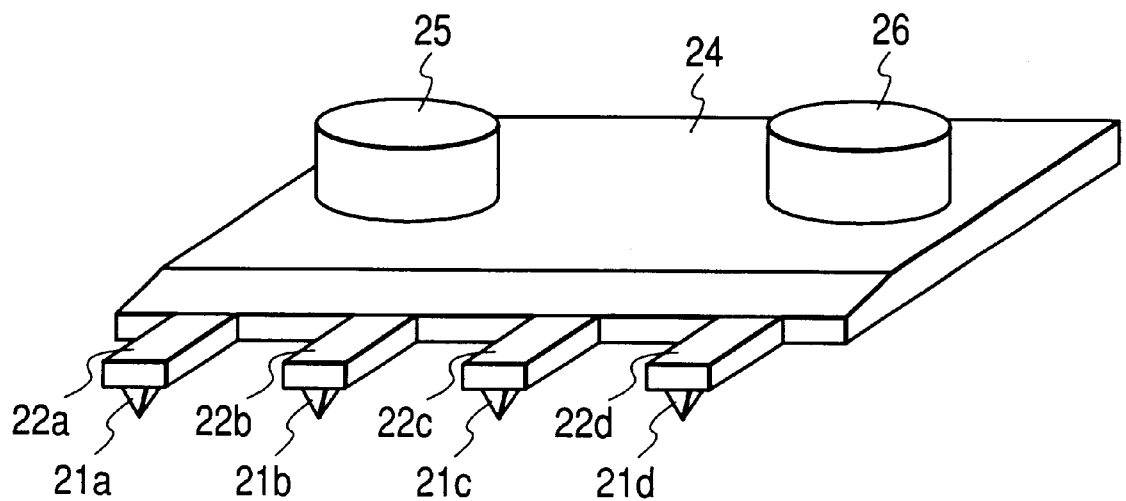
FIG. 2A is a perspective view illustrating cantilevers of the electron exposure apparatus shown in FIG. 1 and its holder.
Figure 2B:
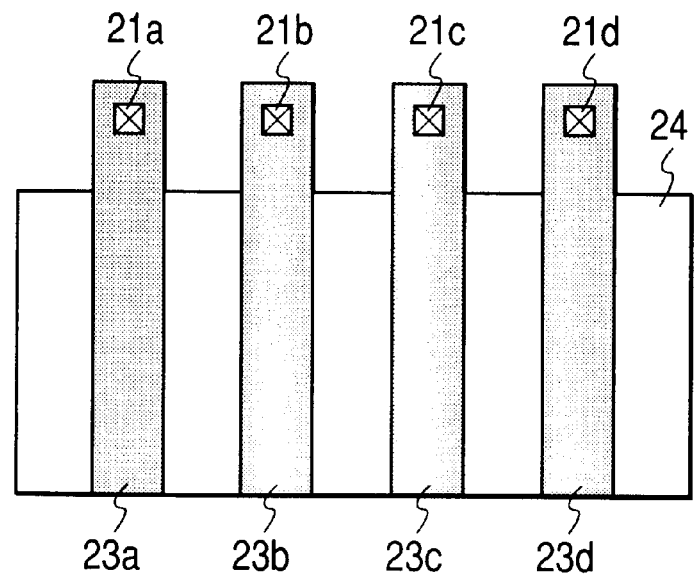
FIG. 2B is a plan view thereof as seen from the back sides of the cantilevers shown in FIG. 2A.

FIG. 2A is a perspective view showing the cantilevers and the holder therefor of the electron exposure apparatus shown in FIG. 1. FIG. 2B is a plan view showing the cantilevers as seen from the back sides thereof. The tips 21a through 21d are provided at the leading ends of the springs 22a through 22d which serve as the cantilevers, respectively. Further, conductive films 23a through 23d are formed on one surface of the springs 22a through 22d respectively. These conductive films are electrically connected to the voltage application part 7 and the current detector 6 through unillustrated connectors. The tips 21a through 21d and the springs 22a through 22d are held by the holder 24 but integrally formed by a silicon single crystal using a micro-fabrication technique, for example. These may be silicon oxide or silicon nitride. The piezo elements 25 and 26 for correcting the slope of the holder 24 and performing the above transfer for approach are provided on a cantilever-free surface of the holder 24.

A radius of curvature of the leading end of each tip 21, a spring constant of each spring 22 and a resonant frequency may suitably be in the ranges of 10 nm to 100 nm, 0.05N/m to 5N/m and 10 kHZ to 50 kHZ respectively. Further detailed data about these parameters will be described later.

It can be said that although the leading positions of the respective tips 21a through 21d with respect to the wafer 8 depend on working accuracy, they can be kept in a dispersion range of less than or equal to 50 nm and substantially placed on the same line. Each conductive film 23 is a titanium thin film ranging from 10 nm to 50 nm in thickness, which is formed by evaporation. In addition to titanium, tungsten, molybdenum, titanium carbide, tungsten carbide or molybdenum carbide may be used as the conductive film.

An electron exposure procedure using the electron exposure apparatus shown in FIGS. 1 and 2 will be collectively explained. The electron exposure takes a procedure for approaching each tip by the wafer 8 as a first stage, correcting the slope of each tip as a second stage and performing electron exposure as a final stage.

As mentioned previously, the wafer 8 is first mounted on the transfer stage 12 and thereafter a suitable voltage is applied to each of the tips 21a through 21d by the voltage application part 7. These currents resultant from the voltage are detected by the current detector 6. Further, the transfer stage 12 is moved in the Z-axis direction under the control of the drive and exposure controller 13 until the current flowing through any of the tips reaches a predetermined value to thereby allow the wafer 8 to approach each tip. At this time, the voltage application part 7 varies a voltage V applied between each of the tips 21a and 21d and the wafer 8. A current I that flows at this time is detected by the current detector 6. Thereafter, the capacitance between the wafer 8 and each tip may be calculated from I/(dV/dt) to estimate the distance between each tip and the wafer 8.

Next, the drive and exposure controller 13 supplies a signal to the slope corrector 5 so that the difference in current between both tips 21a and 21d provided at both ends is brought to nothing, thereby controlling the piezo elements 25 and 26, whereby an inclination formed between a line for connecting these tips to each other and the plane of the wafer 8 is controlled so as to be eliminated. Alternatively, it may be practiced to calculate the capacitance, estimate the slope from the distance, and supply a signal from the drive and exposure controller 13 to the slope corrector 5 so as to control the piezo elements 25 and 26, thereby correct the slope.

The distance between each of the tips 21a through 21d and the wafer 8 becomes less than or equal to a predetermined value. After the completion of the slope correction, the electron exposure apparatus proceeds to an electron exposure process. A set value of the distance between each of the tips 21a through 21d and the wafer 8 may suitably range from 10 nm to 1 μm.

A description will next be made of the electron exposure. The electron exposure is performed by applying a voltage corresponding to an electron-exposure pattern supplied from the pattern input part 60 between each of the tips 21c and 21d and the conductive layer 10 by the voltage application part 7 under the control of the drive and exposure controller 13 while moving the wafer 8 on the transfer stage 12 along the X-Y surface. Thus, currents flow in the resist layer 11 directly below the tips 21c and 21d and thereby resist molecules react with each other to form a latent image within the resist layer 11.

The voltage therebetween applied from the voltage application part 7 is varied by the drive and exposure controller 13 so that the currents detected by the current detector 6 or currents obtained by correcting currents charged and discharged through capacitance between the tips and the substrate become constant as exposure doses (exposure currents). This can be controlled in various forms. Specific examples will be enumerated as follows:

(1) when a current I is controlled, a voltage value given by an expression 1 is outputted:

$$V(t) = G_i \int_0^t (I_S - I(t)) dt \quad (1)$$

where $G_i$ indicates feedback gain and $I_s$ indicates a set current.

(2) when power P=IV is controlled, a voltage value represented by an expression 2 is outputted:

$$V(t) = G_P \int_0^t (P_S - I(t)V(t)) dt \quad (2)$$

where $G_p$ indicates feedback gain and $P_s$ indicates set power.

(3) When capacitances C, which exist between the tips 21a through 21d and springs 22a through 22d and the substrate 9 are taken into consideration, a charge and discharge current given by an expression 3 flows as a voltage V varies:

$$I_C(t) = C \frac{dV}{dt} \quad (3)$$

The output voltage at current control, which is given by the expression 1, is rewritten as the following expression in consideration of the expression 3:

$$V(t) = G_i \int_0^t \left\{ I_S - \left( I(t) - C \frac{dV}{dt} \right) \right\} dt \quad (4)$$

Further, the output voltage at power control, which is given by the expression 2, is rewritten as follows:

$$V(t) = G_P \int_0^t \left\{ P_S - \left( I(t) - C \frac{dV}{dt} \right) V(t) \right\} dt \quad (5)$$

(4) Further, a feedback control system constructed by the current detector 6 and the drive and exposure controller 13 has a time constant τ and thereby removes a high-frequency component. This feedback control system serves as a filter even with respect to the charge and discharge current Ic. In order to accurately eliminate the influence of Ic, the above expression (4) is rewritten in the following manner in consideration of the time constant τ:

$$V(t) = G_i \int_0^t \left\{ I_S - \left( I(t) - \frac{C}{\tau} C \int_0^t \frac{dV}{dt} e^{\frac{t'-t}{\tau}} dt' \right) \right\} dt \quad (6)$$

Thus, the above expression (5) is given as follows:

$$V(t) = G_P \int_0^t \left\{ P_S - \left( I(t) - \frac{C}{\tau} C \int_0^t \frac{dV}{dt} e^{\frac{t'-t}{\tau}} dt' \right) V(t) \right\} dt \quad (7)$$

In the present embodiment, the wafer 8 coated with the resist RD2100N having the thickness of 100 nm is moved at 0.1 mm/s so that the voltage applied between each of the tips 21c and 21d and the conductive layer 10 is set to the neighborhood of −85V and the current is set to be 100 pA, i.e., the exposure dose is set to be 10 nC/cm.

During a period in which the latent image is being formed within the resist layer 11, the tips 21b and 21c undergo the Coulomb force, which acts between each of the tips 21b and 21c and the conductive layer 10 by the voltage applied to create the latent image. Due to the Coulomb force, the respective springs 22b and 22c are bent or deformed and the respective tips are held in contact with the resist layer 11. There are also portions in which no latent images are formed according to patterns to be created. Since the portions do not need the currents, it is unnecessary to apply the voltage to the corresponding tips at these positions. However, since the Coulomb force, which has acted on the tips, is brought to nothing when the voltage is set to 0V, no respective springs 22b and 22c are deformed and thereby spaced away from the surface of the resist layer 11. In the case, the Coulomb force abruptly acts on the tips when the voltage is applied thereto at the position to form the latent image again, so that the respective springs 22b and 22c are suddenly deformed. Therefore, there is a high possibility that the tips will hit against the resist layer 11 heavily to thereby break. Thus, when the latent-image creation-free portions are subjected to electron exposure, it is better to control the voltage so that such a small current as not to form the latent image flows. In the present embodiment, the current becomes less than or equal to 1 pA when the voltage to be applied is set to −70V or less, and hence no latent image is formed. On the other hand, the current used for position monitoring by the tips located at both ends is naturally performed to this extent or less. However, the impressed voltage may preferably be set to such a voltage as to merely supply a smaller current in such a manner that the respective springs 22a and 22d are not deformed by the Coulomb force wherever possible.

Figure 6:
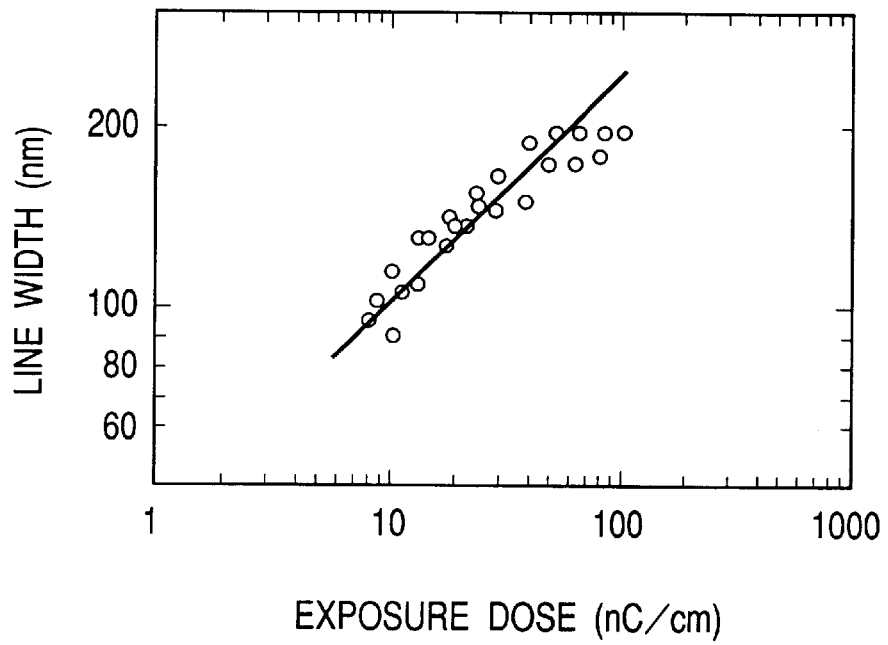
FIG. 6 is a diagram showing one example of the relationship between an exposure dose of a current applied from each tip employed in an electron exposure apparatus of the present invention and a line width of a wafer.

A brief description on development of the latent image drawn by the present invention is as follows:

The latent image is developed by being immersed in a tetramethylammonium hydroxide solution of 0.83% for one minute. As a result, when a negative-type resist is used for the resist layer 11, only a resist with a latent image formed thereon is left behind without its dissolution, so that a convex type line resist pattern having a line width of 100 nm can be created. When a positive-type resist is used for the resist layer 11, only a resist with a latent image formed thereon is dissolved to thereby create a concave type line resist pattern having a line width of 100 nm. FIG. 6 shows the relationship between a pattern width and an exposure dose employed in the embodiment of the present invention. The same drawing shows the case in which since the pattern width depends on the exposure dose, an arbitrary pattern width of 100 nm or more can be formed by adjusting the exposure dose.

In the present invention, the electron exposure takes a procedure for approaching each tip by the wafer 8 as a first stage, correcting the slope of each tip as a second stage and performing electron exposure as a final stage. Tips at ends, are used for positioning and monitoring of positions being under electron exposure, and other tips are used for electron exposure, whereby tips used for electron exposure may simply perform current control alone. Further, the present invention could provide a useful approach or method in that attention has been focused on the fact that the electron exposure could be achieved by the current control alone without strict position control due to the deformation of each tip by the Coulomb force upon formation of the latent image. In the description of the above embodiment, the number of tips is only four. However, the more the number of the tips increases, the more the merit of the present invention becomes great. Incidentally, the aforementioned embodiment shows the case in which the approach of each tip to the wafer 8 is made by moving the wafer 8 in the Z-axis direction. However, the piezo elements 25 and 26 on the holder 24 holding the tips thereon may be used for this approach.

[Embodiment II]

FIG. 3A is a plan view showing other embodiments of the cantilevers of the electron exposure apparatus of the present invention and its holder as seen from the back sides of the cantilevers. FIG. 3B is a side view thereof. As is understood in contrast with FIGS. 2A and 2B, a tip unit 30 having a number of springs 31a, 31b, ..., 31k, ..., 31n, and 32a, ... 32m, ... 3jm is shown as an illustrative example. These springs are respectively held within holders 34a, 34b, 34c and 34d and their holders are held by a common holder 35. While conductive lines for respective tips are typically designated at numerals 33, they are caused to lead through unillustrated connectors to provide necessary connections. As shown in FIG. 3B, piezo elements 36 through 36c corresponding to the piezo elements 25 and 26 shown in FIG. 2A are provided on the back of the common holder 35. The piezo element 36a is not seen in FIG. 3A or 3B, but refer to FIG. 8C for its location. The piezo elements 36a and 36b are used to control a slope or inclination in an X direction shown in the drawing using the tips 31a and 31n. The piezo elements 36b and 36c are used to control an inclination in a Y direction shown in the drawing using the tips 31n and 3jm.

[Embodiment III]

Figure 4A:
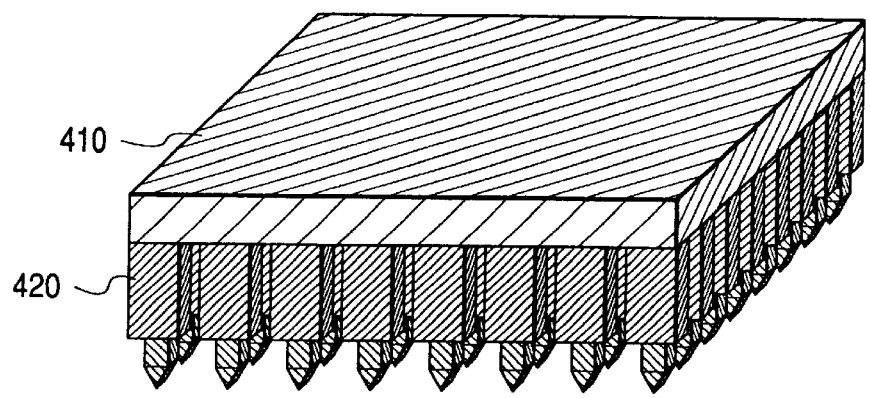
FIG. 4A is a perspective view depicting embodiments of an integrated tip driver group and a holder thereof capable of being employed in the present invention.
Figure 4B:
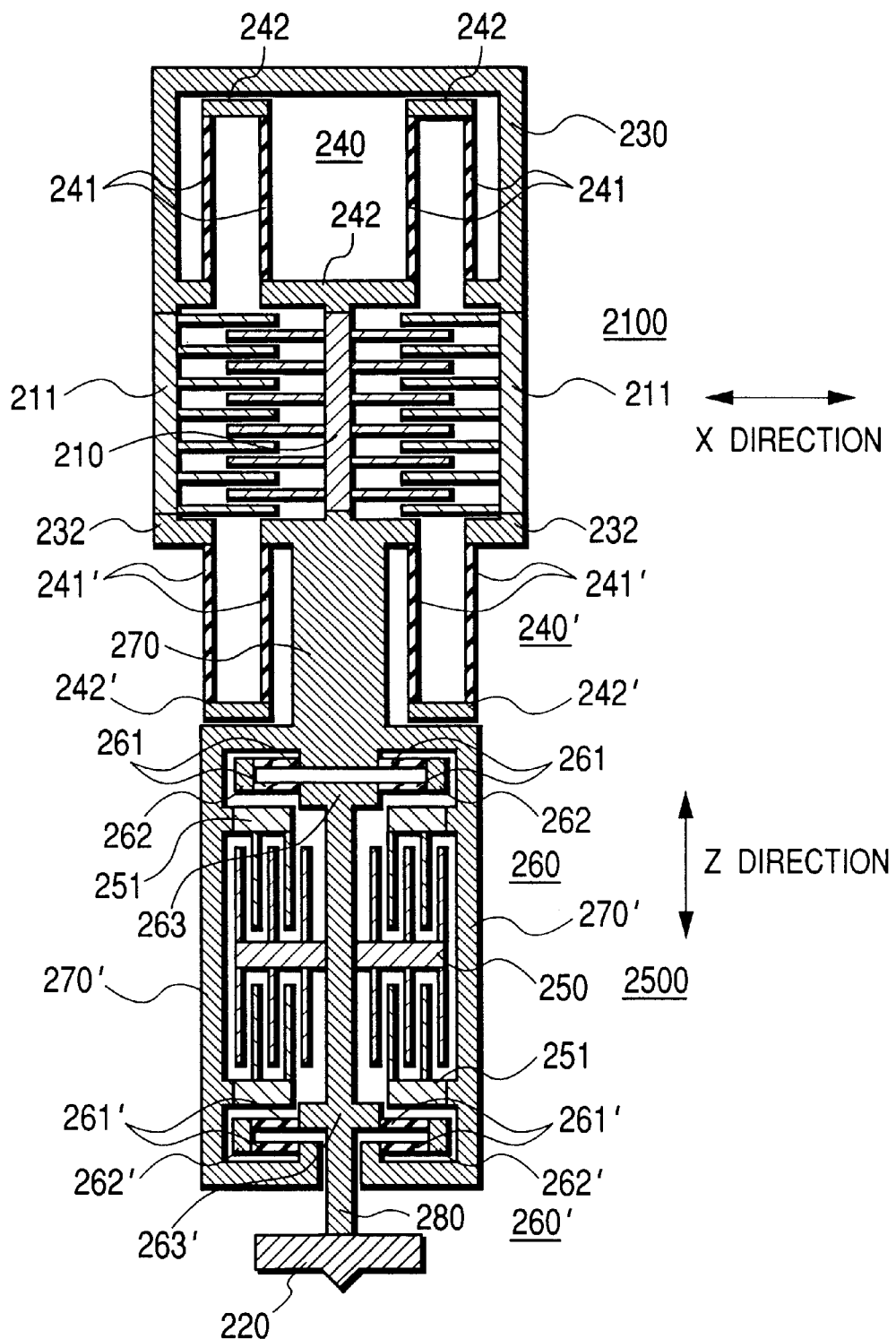
FIG. 4B is a cross-sectional view showing the structure of each unitary tip driver of the integrated tip driver group shown in FIG. 4A.

FIG. 4A is a perspective view showing embodiments of an integrated tip driver group and a holder thereof, both capable of being employed in the present invention. FIG. 4B is a cross-sectional view showing the structure of each unitary tip driver shown in FIG. 4A.

FIG. 4A is a conceptual diagram showing the structure of an embodiment in which a number of tip drivers 420 shown in FIG. 4B are two-dimensionally provided in the X and Y directions and held by a coarse mechanism 410 to thereby allow control of the positions of the tips. The number of tip drivers 420 corresponding to the respective tips and springs shown in FIGS. 3A and 3B are two-dimensionally placed in the X and Y directions. The structure in which a group of the tip drivers 420 is held by the coarse mechanism 410 corresponding to the common holder 35 and piezo elements 36a through 36c shown in FIGS. 3A and 3B to thereby allow control on the positions of the tips, is shown in the drawing.

If done in this way, then the coarse mechanism 410 can perform XY two-dimensional driving for electron exposure as well as execute an approach and a slope correction. These functions may instead be divided into parts so as to bear their burdens as in the aforementioned embodiment.

The structure of the coarse mechanism 410 employed in the present embodiment will not be described in detail.

However, if the structure thereof is devised by micro-fabrication in a manner similar to the fabrication of the tip drivers 420 shown in FIG. 4B and the combination of it with the piezo elements is devised, it can be then easily fabricated. Conversely, the simple holder and piezo elements shown in FIG. 2A may be utilized in combination.

An example of the tip driver 420 will be explained below with reference to FIG. 4B. FIG. 4B is a block diagram showing one example of the structure of the tip driver 420. The present embodiment is equivalent to one in which a first integrated electrostatic actuator 2100 and a second integrated electrostatic actuator 2500 are cascade-connected. Namely, a fixed electrode 270 of the second actuator 2500 is electrically connected to a movable electrode 210 of the first actuator 2100. A tip 220 is mounted to a drawn or extended leading end of the movable electrode 250 of the second actuator 2500. Further, the first integrated electrostatic actuator employed in the present embodiment is one actuator and can be driven in X and Y directions. Thus, movements in the X and Y directions and a movement in a Z direction are controlled by the first actuator 2100 and the second actuator 2500 respectively.

Fixed electrodes 211 of the actuator 2100 are provided at the leading end of a base 230. A spring 240 comprised of plate springs 241 and connecting portions 242 for respectively coupling the plate springs 241 to each other is provided at the leading end of the base 230 in the same manner as described above. The movable electrode 210 of the actuator 2100 is coupled to its corresponding connecting portion 242 of the spring 240. The other ends of the fixed electrodes 211 of the actuator 2100 are coupled to base end portions 232. A spring 240' made up of plate springs 241' and connecting portions 242' for coupling the plate springs 241' to each other is provided at the base end portions 232. The movable electrode 210 of the actuator 2100 is coupled to a connecting portion of the spring 240' and a Z-drive shaft 270 is coupled to the connecting portion of the spring 240'. Since driving forces, which act between the fixed electrodes 211 and the movable electrode 210 of the actuator 2100, bend the springs 240 and 240' respectively, the Z-drive shaft 270 takes positions in an X direction (parallel to the sheet and in the left and right directions) and a Y direction (normal to the sheet) corresponding to the driving forces of the actuator 2100.

The integrated electrostatic actuator 2500 is provided at the leading end of the Z-drive shaft 270 in the form of the Z-drive shaft 270 as the aforementioned base 230. namely, fixed electrodes 251 supported by a frame portion 270' formed integrally with the Z-drive shaft 270 are formed. Similarly, a spring 260 comprised of plate springs 261 with the frame portion 270' as a fixed portion and connecting portions 262 for coupling the plate springs 261 to each other, and a spring 260' comprised of plate springs 261' and connecting portions 262' for coupling the plate springs 261' to each other, are formed. A tip supporter 280 whose leading end is provided with the tip 220, is coupled to a connecting portion 263 of the spring 260 and a connecting portion 263' of the spring 260'. Further, the movable electrode 250 of the actuator 2500 is coupled to the tip supporter 280. Since driving forces, which act between the fixed electrodes 251 and the movable electrode 250 of the actuator 2500, flex the springs 260 and 260' respectively, the tip supporter 280 assumes a position in the Z direction (parallel to the sheet and in upward and downward directions). In the present embodiment, the Z-drive shaft 270 performs control in the X and Y directions through the actuator 2100 and the tip performs control in the Z direction in this condition.

Although descriptions about wiring or interconnections to the respective electrodes, interconnections for a voltage to be applied to each tip and the need or not for insulation have been omitted in the illustrated embodiment to simplify illustrations in the drawing, they can be implemented by arbitrary configurations as needed. Therefore, a further description will be omitted.

A plurality of the structures each illustrated in the embodiment shown in FIG. 4B are one-dimensionally placed in parallel so as to be brought into integration by a semiconductor micro-fabrication technique with one substrate as a base. Further, the base 230 and the base end portions 232 may be directly mounted on one substrate used as the base and other portions processed by the semiconductor micro-fabrication technique, whereby integrated tip drivers having integrated electrostatic actuators can be configured in form away from the substrate. Thus, the integrated tip drivers one-dimensionally placed on one chip in parallel can be extremely easily constructed.

Two-dimensionally disposed integrated tip drivers can be also easily formed by stacking the structures of the integrated tip drivers one-dimensionally placed in parallel on one chip, according to the present embodiment on one another in plural form.

In the present invention, since the number of tip drivers 420 is sufficient if the entire approach, the slope correction and the position control being under electron exposure are carried out, it is essentially unnecessary to control the positions of the individual tips 220 of many tip drivers. However, this ability is useful if a correction to partial electron exposure or the like is taken into consideration.

[Embodiment IV]

Figure 5:
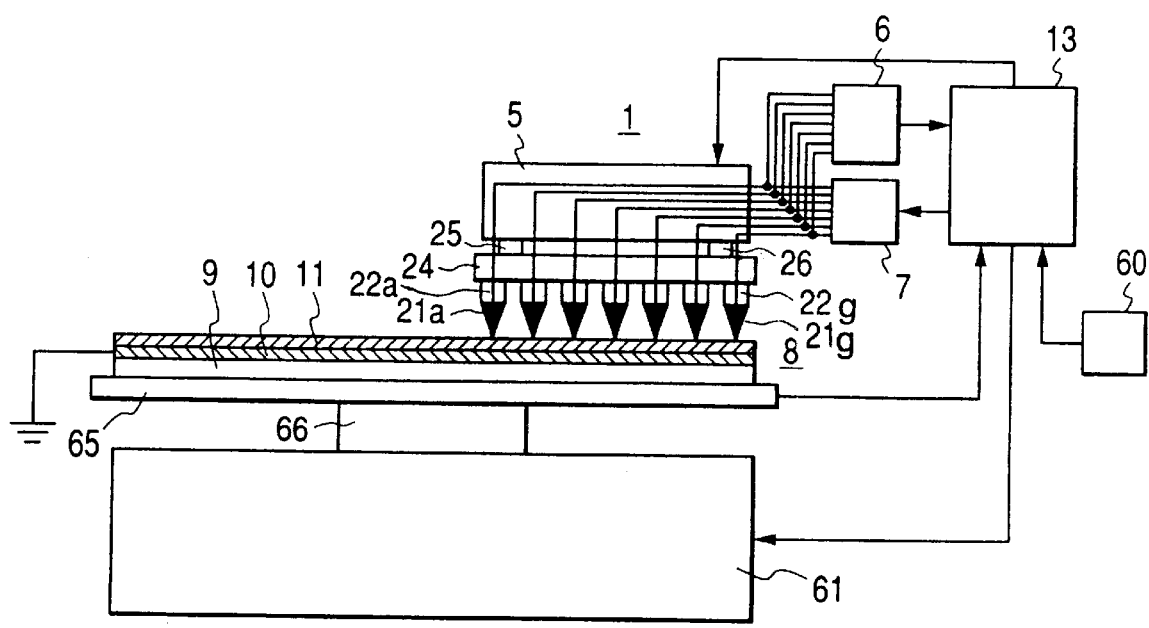
FIG. 5 is a block diagram illustrating the concept of a configuration of another embodiment of an electron exposure apparatus according to the present invention.

An embodiment used as an electron exposure apparatus for rotating a wafer to make electron exposure will next be described with reference to FIG. 5. The present embodiment essentially remains unchanged as compared with the electron exposure apparatus according to the embodiment shown in FIG. 1. However, in the present embodiment, a wafer 8 is rotated and a micro-fabrication electron exposure head 1 is placed so as to be put to one side of the wafer 8. Elements of structure used in common in both embodiments are identified by the same reference numerals. The transfer part 12, the transfer stage 15 and the drive mechanisms 16, 17 and 18 to be moved in the X, Y and Z directions, which are employed in the embodiment shown in FIG. 1, are replaced by a rotatable driving part 61, a rotatable stage 65 and a rotatable shaft 66 respectively. A drive and exposure controller 13 supplies a rotation signal to the rotatable driving part 61 in response to a control signal supplied from a pattern input part 60. This rotation signal allows the rotatable stage 65 to be rotated through the rotatable shaft 66 and information about this rotation is fed back to the drive and exposure controller 13, where position control is performed precisely.

Although an approach operation is done prior to the electron exposure even in the present embodiment, this operation allows the rotatable shaft 66 to be shifted (Z-axis driven) upwardly according to a signal supplied to the rotatable driving part 61 from the drive and exposure controller 13. When the rotatable stage 65 is moved until tips 21*a* through 21*g*, provided at the leading ends of springs 22*a*–22*g*, respectively, take predetermined positions with respect to the surface of a resist layer 11 of the wafer 8 to be subjected to electron exposure, their approaches are brought to completion. Thereafter, a slope correction is carried out and consecutively the rotatable stage 65 is rotated to draw a pattern on the resist layer 11 of the wafer 8. The rotatable driving part 61 is controlled by the drive and exposure controller 13 to continue position control in the Z-axis direction in such a way as to monitor the magnitudes of currents using the tips 21a and 21g located at both ends and thereby maintain the distance between the resist layer 11 and each tip as a suitable value while the pattern is being drawn. Further, the present embodiment is considered to frequently need the operation of correcting a slope resultant from rotation by a corrector 5 even during the electron exposure as compared with the embodiment shown in FIG. 1. However, the operation can be executed without any hindrance owing to the monitoring of positions by the tips located at both ends.

Since the micro-fabrication electron exposure head 1 is relatively small as compared with the wafer 8 in the present embodiment, a complete round-shaped resist pattern usable in a recording track of an optical disk, for example, can be formed if the wafer 8 is developed after having been rotated 360° by the wafer rotatable stage 65. Further, if the wafer 8 is developed after having been rotated 360° by the wafer rotatable stage 65 while the micro-fabrication electron exposure head 1 is being moved in the direction of the center of rotation thereof from side to side with a certain point thereof as the center while a constant exposure dose is being radiated continuously, then a waveform resist pattern can be formed in circular form. Alternatively, if the wafer 8 is developed after the micro-fabrication electron exposure head 1 has been fixed and the wafer 8 has been rotated 360° by the wafer rotatable stage 65 while switching is made between a latent-image formable exposure dose and a latent-image unformable exposure dose, then a dot pattern usable for data information and address information in the optical disk can be formed in circular form. If this operation is continuously performed so as to draw patterns over the entire area of the wafer 8, then the patterns can be drawn over the entire area thereof in twenty hours under the condition that the tips are arranged at 0.1 mm pitches, track pitches are defined as 100 nm and the rotational speed is at 50 rpm.

An original plate for the optical disk can be created by combining the methods shown in the above. Further, if a concave type dot resist pattern is formed over the entire surface of the disk and a magnetic material such as an iron, cobalt, nickel, iron-cobalt alloy, a cobalt-nickel alloy, an iron-nickel alloy or the like is buried in the dot pattern by electric plating with a conductive layer 10 as an electrode, then an ultrahigh-density magnetic recording medium with magnetic dots as isolated recording bits can be created.

[Embodiment V]

Figure 7:
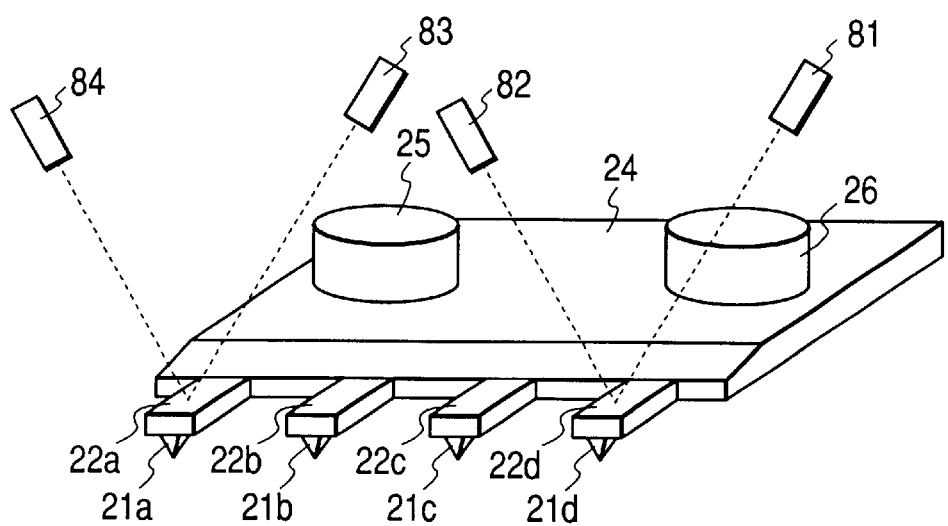
FIG. 7 is a perspective view depicting embodiments different from the cantilevers and the holder thereof shown in FIG. 2A.

Next, FIG. 7 is a perspective view showing different embodiments of the cantilevers and their holder shown in FIG. 2A.

The present embodiment illustrates one, as an example, in which displacements in cantilevers 22a and 22d located at both ends are detected by an optical level deflection sensor type atomic force microscope. Reference numerals 83 and 81 indicate light sources and reference numerals 84 and 82 indicate photo-detectors. Since the atomic force microscope does not need to allow currents to flow between tips 21a and 21d and a wafer 8, it is unnecessary to apply a voltage to each tip 21. Thus, springs are not deformed by experiencing the Coulomb force resultant from the voltage applied to each of the tips 21a and 21d. Therefore, when the atomic force microscope is used to monitor positions by the tips located at both ends, stable position control and slope control can be achieved.

[Embodiment VI]

Figures 8A, 8B:
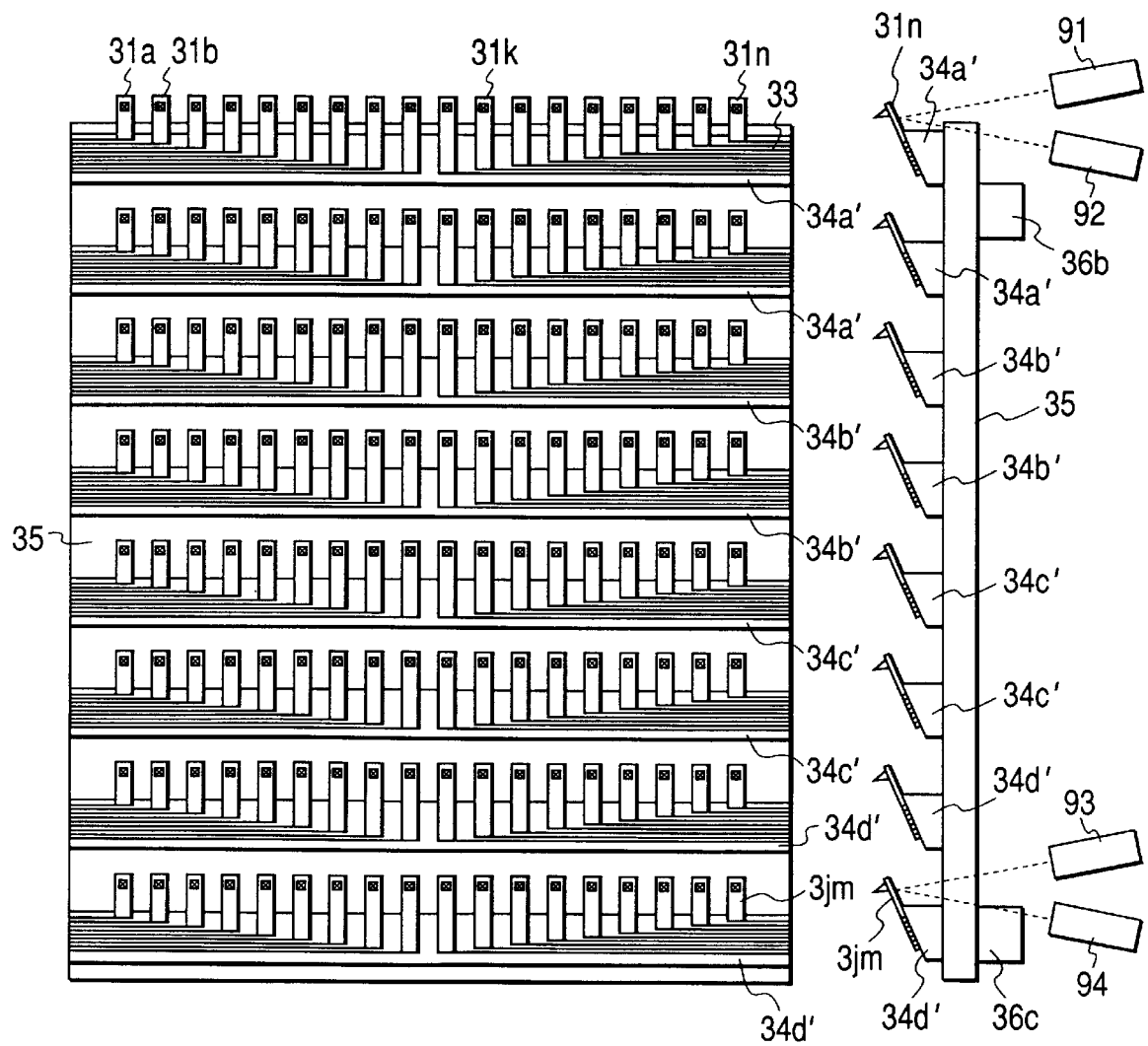
FIG. 8A is a plan view showing modifications of the cantilevers and its holder shown in FIG. 3A as seen from the ventral sides of the cantilevers.
FIG. 8B is a side view depicting the modifications.
Figure 8C:
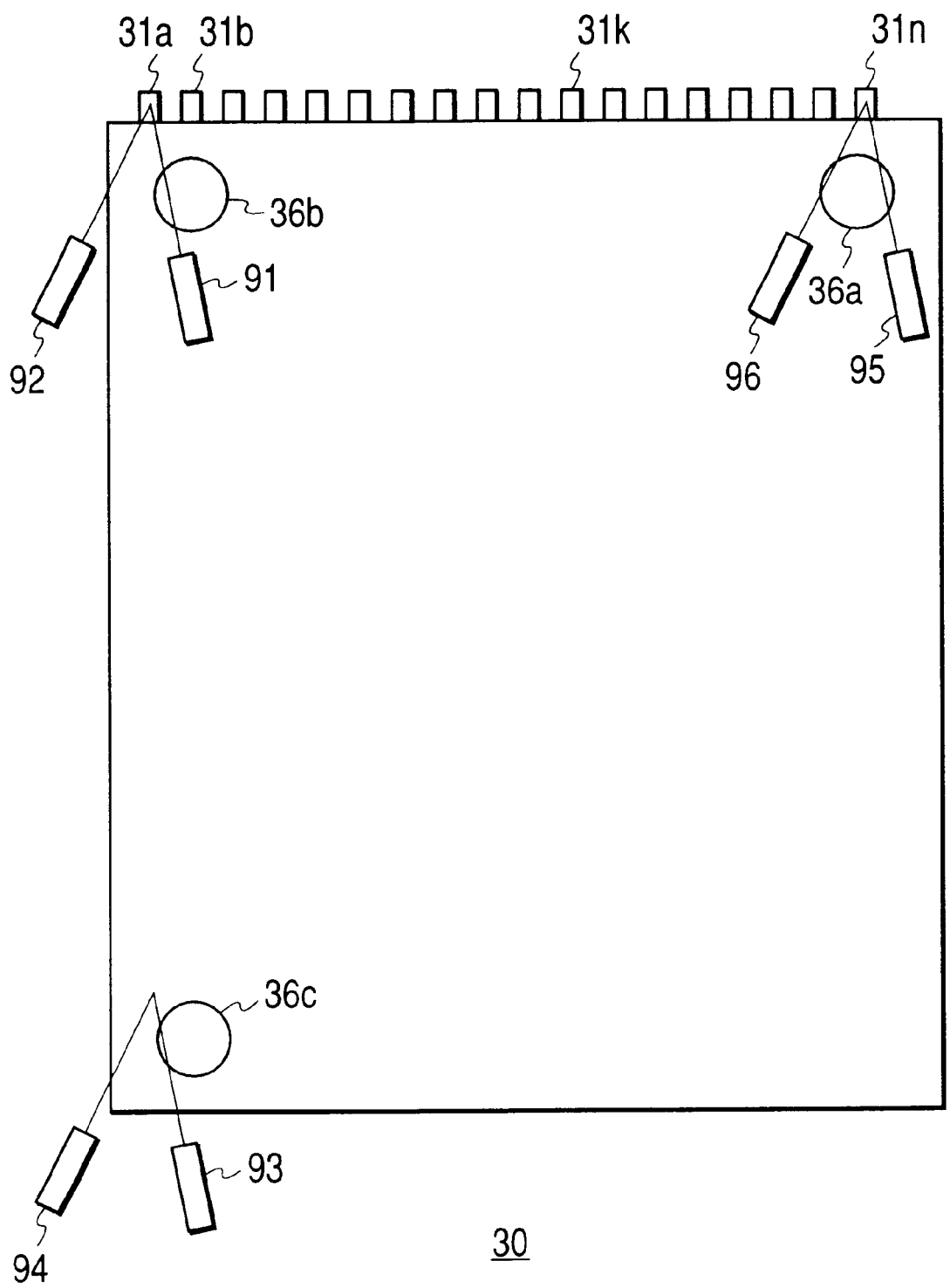
FIG. 8C is a rear elevation illustrating the modifications.

FIG. 8A is a plan view showing modifications of the cantilevers and their holder shown in FIG. 3A as seen from the back sides of the cantilevers. FIG. 8B is a side view thereof. FIG. 8C is a rear elevation thereof.

As is clearly understood in the present embodiment from the contrasts between FIG. 3A and FIG. 8A and between FIG. 3B and FIG. 8B, holders 34a through 34d are divided into two: 34a', 34a' to 34d', 34d'. Further, the cantilevers are inclined toward their corresponding holders and set identical to one another in direction. Moreover, the present embodiment shows one in which displacements in cantilevers 31a, 31n and 3jm at ends are detected by an optical lever deflection sensor type atomic force microscope in a manner similar to the embodiment shown in FIG. 7. Reference numerals 91, 93 and 95 indicate light sources and reference numerals 92, 94 and 96 indicate photo-detectors, respectively as shown in FIG. 8C. The present embodiment brings about an advantageous effect in that since the cantilevers are set to have the same slopes and directions, springs of cantilevers effectively act on irregularities or projections and depressions of the surface of a resist 11 upon movement of a wafer 8, whereby the possibility that tips will be damaged can be reduced. Further, since the displacements in the cantilevers are detected by the atomic force microscope, an advantageous effect can be also brought about in that stable position and slope control can be achieved in a manner similar to the previous embodiment. In the present embodiment, as is apparent by reference to FIG. 8C, some of a holder 35 must be cut so as to cause light to pass therethrough in order to transmit light of the atomic force microscope for detecting a displacement in the cantilever 3jm.

[Embodiment VII]

FIG. 9A is a plan view showing other modified embodiments of the cantilevers and their holder shown in FIG. 3A as seen from the ventral sides of the cantilevers. FIG. 9B is a side view thereof.

As is clearly understood from the contrasts between FIG. 8A and FIG. 9A and between FIG. 8B and FIG. 9B, the present embodiment shows one, as an example, in which as an alternative to the detection of the displacements in the cantilevers 31a, 31n and 3jm at the ends by the atomic force microscope, the approach of the tip unit 30 to the wafer 8 and the monitoring of their positions are carried out by providing at least three electrodes 41, 42 and 43 at three points of the surface of a holder 35 on the cantilever side (four electrodes at four points are shown) and detecting capacitances between the electrodes and a conductor portion of the wafer.

In the present embodiment, when the wafer is set to a transfer stage 15, no capacitances can be substantially detected. However, when the approach to the wafer 8 proceeds and the tip unit 30 approaches the wafer 8 to some extent, the capacitances can be detected. The approach of the tip unit 30 to the wafer 8 can be completed using this. Further, even the monitoring of their positions during electron exposure can be performed using it.

[Embodiment VIII]

Figures 10A, 10B:
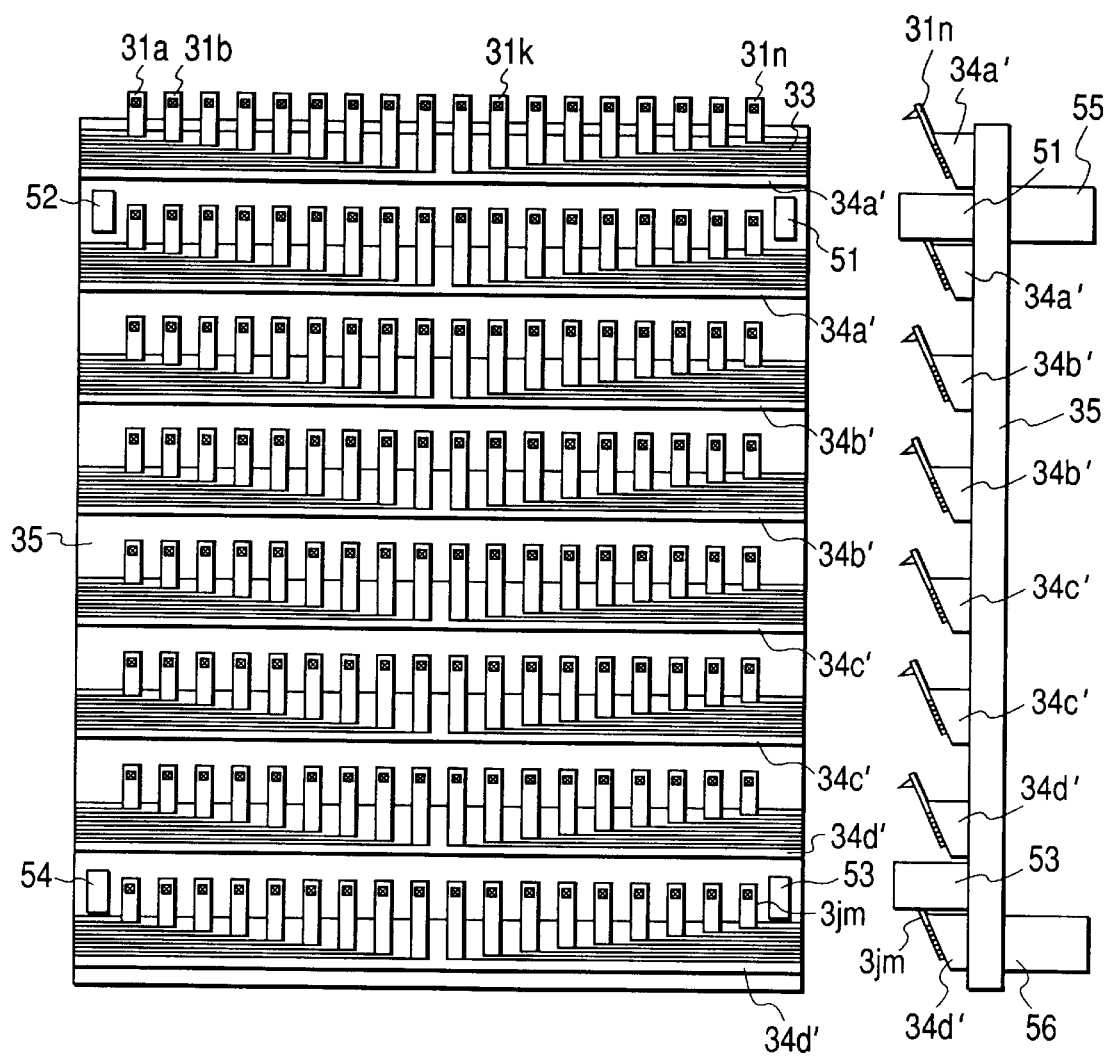
FIG. 10A is a plan view depicting further modifications of the cantilevers and its holder shown in FIG. 3A as seen from the back sides of the cantilevers.
FIG. 10B is a side view showing the modifications shown in FIG. 10A.

FIG. 10A is a plan view showing further embodiments illustrative of modifications of the cantilevers and their holder shown in FIG. 3A as seen from the ventral sides of the cantilevers. FIG. 10B is a side view thereof.

As is clearly understood from the contrasts between FIG. 9A and FIG. 10A and between FIG. 9B and FIG. 10B, the present embodiment is one in which the relationship in position between a tip unit 30 and a wafer 8 is directly held by sliders 51, 52, 53 and 54 interposed therebetween. Weak spring devices 55, 56, 57 and 58 (57 and 58 not shown in the drawing) are provided at the four corners of the back of a holder 35 so that these sliders are kept in contact with the wafer 8 by a weak force.

In the present embodiment, the wafer 8 is set to a transfer stage 15 and thereafter the holder 35 is pressed against the wafer 8 by a weak force at an approach stage. Afterwards, if this state is kept as it is, it is then unnecessary to perform position control being under electron exposure in particular.

[Examples of parameters for cantilevers]

Figure 11A:
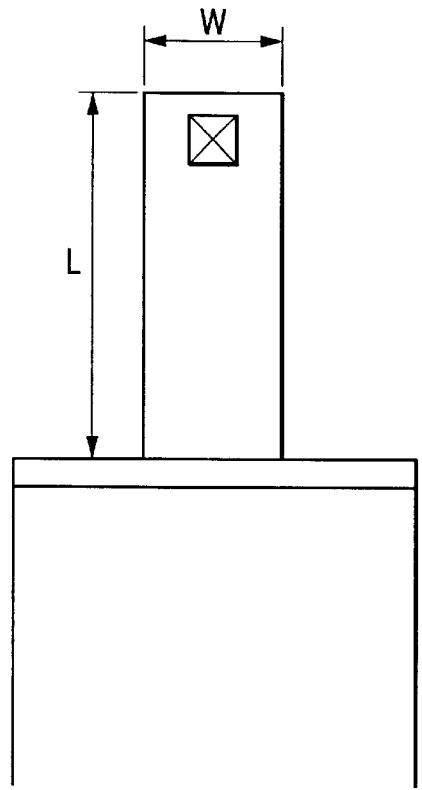
FIG. 11A is a plan view showing an example illustrative of parameters of a cantilever, for describing a displacement thereof due to the Coulomb force.
Figure 11B:
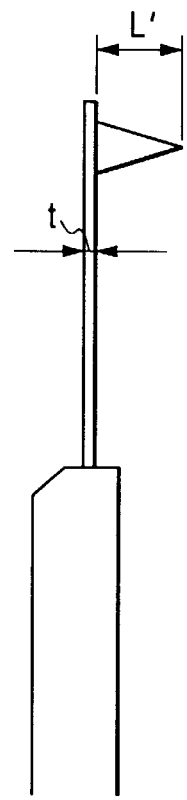
FIG. 11B is a side view showing the example illustrative of the parameters shown in FIG. 11A.

FIG. 11A is a plan view showing one example illustrative of parameters for each cantilever, for describing a displacement in cantilever by the Coulomb force. FIG. 11B is a side view thereof. The cantilever illustrated in this example has a width of W, a length of L and a thickness of t. Further, the length of a tip ranges from about 10 to 15 $\mu$m. In this example, the Coulomb force was roughly calculated by a parallel plate capacitor formed between the conductive layer 10 and each cantilever 22 shown in FIG. 1.

A force F, which acts between electrode plates of the parallel plate capacitor, is first given by the following equation. In the equation, $\epsilon_0$ indicates a dielectric constant of a dielectric that exists between the electrode plates, S indicates the area of each electrode plate, V indicates a voltage applied between the electrode plates, and d indicates the distance between the electrode plates.

$$F = \epsilon_0 \frac{SV^2}{2d^2}$$

The three samples of A through C different in constant from each other are now prepared as the cantilevers. Their parameters are respectively as follows:

| Sample | Width W $\mu$m | Length L $\mu$m | Thickness t $\mu$m | Spring constant CN/m |
|---|---|---|---|---|
| A | 50 | 450 | 2.0 | 0.1 |
| B | 60 | 450 | 4.0 | 2.0 |
| C | 30 | 225 | 5.0 | 20.0 |

Assuming now that the area of electrode plate S is the same as the area of the cantilever holding the tip, the result of calculation made to the Coulomb force between the cantilever and wafer face is given in the Table shown below.

| Area of cantilever S | Distance between electrode plates d | Voltage between electrode plates V | Coulomb force F |
|---|---|---|---|
| 50 $\mu$m × 450 $\mu$m | 16 $\mu$m | 40 V | 630 nN |

The result of calculation made to the amounts of deformation or bending of the above samples by now noting an example in which the Coulomb force is 630 nN, is given in the Table shown below.

| Sample | Amount of bending (nm) |
|---|---|
| A | 6300 |
| B | 315 |
| C | 32 |

As is understood from the example, such a large force and deformation or bending occur even when the voltage is 40V. Thus, when −80V is applied upon the aforementioned electron exposure, each cantilever greatly deforms or bends and hence control on the position of each cantilever for electron exposure does not make sense. Conversely, the cantilevers stably follow the non-uniformity of the thickness of the resist layer 11 due to this deformation. This is an important point of view of the present invention to be noted.

Figure 12A:
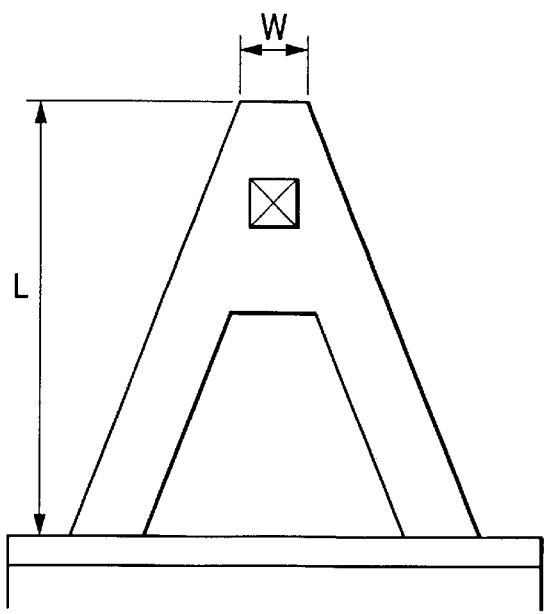
FIG. 12A is a plan view depicting an example illustrative of other parameters of a cantilever, for describing a displacement thereof due to the Coulomb force.
Figure 12B:
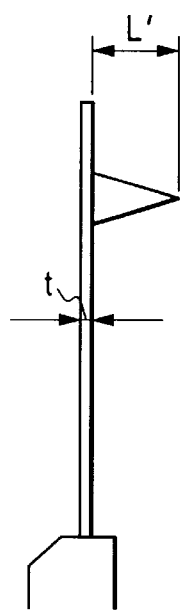
FIG. 12B is a side view illustrating the example illustrative of the parameters shown in FIG. 12A.

Next, FIG. 12A is a plan view showing another example illustrative of further parameters of a cantilever, for describing a displacement in cantilever by the Coulomb force. FIG. 12B is a side view thereof. The cantilever shown in this example is a two-point supported beam. Two examples having 4 $\mu$m defined as widths W of their leading ends, 0.4 $\mu$m defined as their thicknesses t, 200 $\mu$m and 100 $\mu$m defined as their lengths L, 0.02 and 0.09 defined as spring constants and about 6 $\mu$m defined as tip lengths were calculated. The two examples are identical to each other in leading-end end structure and configuration and different from one another in length L alone. When the area of a tip with respect to the surface of each of the cantilevers in the examples is defined as 3700 $\mu$m$^2$, the distance d between electrode plates is defined as 6 $\mu$ and the applied voltage is defined as 40V, the Coulomb force was 730 nN. If the force corresponding to this extent is given, then the cantilever will cause deformations of about 37000 nm and 8100 nm in a manner similar to the cantilever shown in FIG. 11. Thus, even this type of cantilever can take full advantage of deformation.

Although the tip drivers shown in FIGS. 4A and 4B have no cantilevers and do not constitute a parallel plate capacitor as in these examples, the Coulomb force that acts on each tip can be fully utilized because springs 261 and 261' are extremely soft.

According to the present invention, as has been described above, since one control on each tip with respect to the wafer may be performed only at each side of the tip group and only control on the currents may be carried out at other tips, an electron exposure apparatus capable of performing electron exposure at high speed can be easily fabricated.

Since it is unnecessary to strictly perform the approach and the slope control, such structures as shown in FIGS. 9 and 10 may be used as the simplest structure or may be one, although not shown in the drawing, of a type wherein electrodes are placed on the backs of cantilevers and displacements in cantilevers are detected from changes in capacitance between the two.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A fabrication apparatus, comprising:

a plurality of electrically conductive tips;

a plurality of first holders, each having a surface which has a conductive line for providing an exposure current to a respective one of said tips, for holding said tips;

a second holder having a surface which has conductive lines connected to said conductive lines on said first holders, for holding said first holders;

a third holder for holding said second holder;

a coarse moving mechanism of a wafer, for approaching to said plurality of tips, wherein said wafer comprises one of a resist layer on a conductive layer on a substrate and a resist layer on a conductive substrate;

a transfer mechanism, which is provided between said second holder and said third holder, for correcting an inclination of a line which connects two tips at respective ends of said plurality of tips toward the surface of said resist layer;

an X-Y driving mechanism for relatively driving said substrate and said plurality of tips;

control devices for respectively controlling said coarse moving mechanism, said transfer mechanism and said drive mechanism;

a device for supplying currents to said plurality of tips;

detectors for detecting the currents supplied to said plurality of tips;

a control device for allowing target values of the currents supplied to said plurality of tips to coincide with detected values; and a pattern input device for supplying a target value corresponding to an electron-exposure pattern to said control device for controlling said drive mechanism;

wherein said first holders are springs and said plurality of tips are arranged in a row at predetermined intervals;

said two tips at respective ends of said plurality of tips are used to control distances between said plurality of tips and said conductive layer or conductive substrate, and other tips of said plurality of tips are used for electron exposure on said resist layer;

said plurality of first holders are bent or deformed and said plurality of tips are held in contact with said resist layer due to a Coulomb force which acts between said plurality of tips and said conductive layer or conductive substrate by a voltage applied to create a latent image in said resist layer; and said wafer is relatively moved with said plurality of tips by said drive mechanism while holding said plurality of tips in contact with said resist layer.

2. A fabrication apparatus according to claim 1, wherein when said plurality of tips are being approached to said resist layer and the latent image in said resist layer is being formed, displacements of said two tips at respective ends of said plurality of tips are detected by changes in currents between said tips and said conductive layer or conductive substrate; and said inclination is corrected using said detected displacements so as to correct inclination of said second holder toward said resist layer.

3. A fabrication apparatus according to claim 1, wherein when said plurality of tips are being approached to said resist layer and the latent image in said resist layer is being formed, displacements of said two tips at respective ends of said plurality of tips are detected, by an optical level deflection sensor sensing said two tips at respective ends of said plurality of tips; and said inclination is corrected using said detected displacements so as to correct inclination of said second holder toward said resist layer.

4. A fabrication apparatus according to claim 1, wherein when said plurality of tips are being approached to said resist layer and the latent image in said resist layer is being formed, displacements of said two tips at respective ends of said plurality of tips are detected, by changes in capacitances between said two tips and said conductive layer or conductive substrate; and said inclination is corrected using said detected displacements so as to correct inclination of said second holder toward said resist layer.

5. A fabrication apparatus according to claim 1, wherein currents supplied to the tips used for electron exposure are set to values different from one another at a latent-image creation portion and a latent-image non-creation portion.

6. A fabrication apparatus, comprising:

a plurality of electrically conductive tips;

a plurality of first holders, each having a surface which has a conductive line for providing an exposure current to a respective one of said tips, for holding said tips;

a second holder having a surface which has conductive lines connected to said conductive lines on said first holders, for holding said first holders;

a third holder for holding said second holder;

a coarse moving mechanism of a wafer, for approaching to said plurality of tips, wherein said wafer comprises one of a resist layer on a conductive layer on a substrate and a resist layer on a conductive substrate;

a transfer mechanism, which is located between said second holder and said third holder, for adjusting an inclination of said second holder with respect to said resist layer by using two tips at respective ends of said plurality of tips;

a drive mechanism for driving the wafer rotatably about said tips;

control devices for respectively controlling said coarse moving mechanism, said transfer mechanism and said drive mechanism;

a device for supplying currents to said plurality of tips;

detectors for detecting the currents supplied to said plurality of tips;

a control device for allowing target values of the currents supplied to said plurality of tips to coincide with detected values; and a pattern input device for supplying a target value corresponding to an electron-exposure pattern to said control device for controlling said drive mechanism;

wherein said first holders are springs and said plurality of tips are arranged in a row at predetermined intervals;

said two tips at respective ends of said plurality of tips are used to control distances between said plurality of tips and said conductive layer or conductive substrate, and other tips of said plurality of tips are used for electron exposure on said resist layer;

said plurality of first holders are bent or deformed and said plurality of tips are held in contact with said resist layer due to a Coulomb force which acts between said plurality of tips and said conductive layer or conductive substrate by a voltage applied to create a latent image in said resist layer; and said wafer is relatively moved with said plurality of tips along an X-Y surface of said substrate by said drive mechanism while holding said plurality of tips in contact with said resist layer.

7. A fabrication apparatus according to claim 6, wherein when said plurality of tips are being approached to said resist layer and the latent image in said resist layer is being formed, displacements of said two tips at respective ends of said plurality of tips are detected, by changes in currents between said first holder and said conductive layer or conductive substrate; and said inclination is corrected using said detected displacements so as to correct inclination of said second holder toward said resist layer.

8. A fabrication apparatus according to claim 6, wherein when said plurality of tips are being approached to said resist layer and the latent image in said resist layer is being formed, displacements of said two tips at respective ends of said plurality of tips are detected, by an optical level deflection sensor sensing said two tips at respective ends of said plurality of tips; and said inclination is corrected using said detected displacements so as to correct inclination of said second holder toward said resist layer.

9. A fabrication apparatus according to claim 6, wherein when said plurality of tips are being approached to said resist layer and the latent image in said resist layer is being formed, displacements of said two tips at respective ends of said plurality of tips are detected, by changes in capacitances between said two tips and said conductive layer or conductive substrate; and said inclination is corrected using said detected displacements so as to correct inclination of said second holder toward said resist layer.

10. A fabrication apparatus according to claim 6, wherein currents supplied to the tips used for electron exposure are set to values different from one another at a latent-image creation portion and a latent-image non-creation portion.

11. A fabrication apparatus, comprising:

a plurality of electrically conductive tips;

a plurality of first holders, each having a surface which has a conductive line for providing an exposure current to a respective one of said tips, for holding said tips;

a plurality of second holders, each having a surface which has conductive lines connected to said conductive lines on some of said first holders, for holding said first holders;

a third holder for holding said second holders;

a fourth holder for holding said third holder;

a coarse moving mechanism of a wafer, for approaching to said plurality of tips, wherein said wafer comprises one of a resist layer on a conductive layer on a substrate and a resist layer on a conductive substrate;

a transfer mechanism, which is located between said third holder and said fourth holder, for adjusting an inclination of two lines which connect three tips at respective ends of said plurality of tips toward the surface of said resist layer;

an X-Y driving mechanism for relatively driving said wafer and said plurality of tips;

control devices for respectively controlling said coarse moving mechanism, said transfer mechanism and said drive mechanism;

a device for supplying currents to said plurality of tips;

detectors for detecting the currents supplied to said plurality of tips;

a control device for allowing target values of the currents supplied to said plurality of tips to coincide with detected values; and a pattern input device for supplying a target value corresponding to an electron-exposure pattern to said control device; wherein said tips are located on the same side of said first holders;

said first holders, second holders, third holder and fourth holder form a layered structure;

said second holders are located at an opposite side of said first holders from said tips;

said third holder is located at an opposite side of said second holders from said first holders;

said fourth holder is located at an opposite side of said third holder from said second holders;

each said first holder is a spring and said plurality of tips are arranged in an X-Y plane at predetermined intervals;

said three tips at respective ends of said plurality of tips are used to control distances between said plurality of tips and said conductive layer or conductive substrate, and other tips of said plurality of tips are used for electron exposure on said resist layer;

said plurality of first holders are bent or deformed and said plurality of tips are held in contact with said resist layer due to a Coulomb force which acts between said plurality of tips and said conductive layer or conductive substrate by a voltage applied to create a latent image in said resist layer; and said wafer is relatively moved with said plurality of tips by said drive mechanism while holding said plurality of tips in contact with said resist layer.

12. A fabrication apparatus according to claim 11, wherein when said plurality of tips are being approached to said resist layer and the latent image in said resist layer is being formed, displacements of said three tips at respective ends of said plurality of tips are detected by changes in currents between said three tips at respective ends of said plurality of tips and said conductive layer or conductive substrate; and said inclination is corrected using said detected displacements so as to correct inclination of said third holder toward said resist layer.

13. A fabrication apparatus according to claim 11, wherein when said plurality of tips are being approached to said resist layer and the latent image in said resist layer is being formed, displacements of said three tips at respective ends of said plurality of tips are detected by an optical level deflection sensor sensing said three tips at respective ends of said plurality of tips; and said inclination is corrected using said detected displacements so as to correct inclination of said third holder toward said resist layer.

14. A fabrication apparatus according to claim 11, wherein when said plurality of tips are being approached to said resist layer and the latent image in said resist layer is being formed, displacements of three electrodes on the surface of said third holder are detected by changes in capacitances between said three tips at respective ends of said plurality of tips and said conductive layer or conductive substrate; and said inclination is corrected using said detected displacements so as to correct inclination of said third holder toward said resist layer.

15. A fabrication apparatus according to claim 11, wherein currents supplied to the tips used for electron exposure are set to values different from one another at a latent-image creation portion and a latent-image non-creation portion.

16. A fabrication apparatus, comprising:

a plurality of electrically conductive tips;

a plurality of first holders, each having a surface which has a conductive line for providing an exposure current to a respective one of said tips, for holding said tips;

a plurality of second holders, each having a surface which has conductive lines connected to some of said conductive lines on said first holders, for holding said first holders;

a third holder for holding said second holders;

a fourth holder for holding said third holder;

a coarse moving mechanism of a wafer, for approaching said plurality of tips, wherein said wafer comprises one of a resist layer on a conductive layer on a substrate and a resist layer on a conductive substrate;

a transfer mechanism, which is located between said third holder and said fourth holder, for adjusting an inclination of two lines which connect three tips at respective ends of said plurality of tips toward the surface of said resist layer;

an X-Y drive mechanism for relatively driving said wafer and said plurality of tips;

control devices for respectively controlling said coarse moving mechanism, said transfer mechanism and said drive mechanism;

a device for supplying currents to said plurality of tips;

detectors for detecting the currents supplied to said plurality of tips;

a control device for allowing target values of the currents supplied to said plurality of tips to coincide with detected values; and a pattern input device for supplying a target value corresponding to an electron-exposure pattern to said control device; wherein said tips are located on the same side of said first holders;

said first holders, second holders, third holder and fourth holder form a layered structure;

said second holders are located at an opposite side of said first holders from said tips;

said third holder is located at an opposite side of said second holders from said first holders;

said fourth holder is located at an opposite side of said third holder from said second holders;

each said first holder is a spring, and said plurality of tips are arranged in an X-Y plane at predetermined intervals;

said three tips at respective ends of said plurality of tips are used to control distances between said plurality of tips and said conductive layer or conductive substrate, and other tips of said plurality of tips are used for electron exposure on said resist layer;

said tips are formed at leading ends of movable portions of an electromechanical transducer having a plurality of electrostatic actuators formed on one substrate, one of said actuators being a cascade structure in which a fixed electrode is formed in association with a movable electrode of another of said actuators and being arranged to drive a movable electrode in intersecting two-axis directions, said plurality of first holders are bent or deformed and said plurality of tips are held in contact with said resist layer due to a Coulomb force which acts between said plurality of tips and said conductive layer or conductive substrate by a voltage applied to create a latent image in said resist layer; and said wafer is relatively moved with said plurality of tips by said drive mechanism while holding said plurality of tips in contact with said resist layer.

17. A fabrication apparatus according to claim 16, wherein when said plurality of tips are being approached to said resist layer and the latent image in said resist layer is being formed, displacements of said three tips at respective ends of said plurality of tips are detected by changes in currents between said three tips at respective ends of said plurality of tips and said conductive layer or conductive substrate; and said inclination is corrected using said detected displacements so as to correct inclination of said third holder toward said resist layer.

18. A method of performing lithography on a substrate by using an electron exposure apparatus which comprises:

a plurality of electrically conductive tips;

a plurality of first holders, each having a surface which has a conductive line for providing an exposure current to a respective one of said tips, for holding said tips;

a second holder having a surface which has conductive lines connected to said conductive lines on said first holders, for holding said first holders;

a third holder for holding said second holder;

a coarse moving mechanism of a wafer, for approaching said plurality of tips, wherein said wafer comprises one of a resist layer on a conductive layer on a substrate and a resist layer on a conductive substrate;

a transfer mechanism, which is provided between said second holder and said third holder, for correcting an inclination of a line which connects two tips at respective ends of said plurality of tips toward the surface of said resist layer;

an X-Y driving mechanism for relatively driving said substrate and said plurality of tips;

control devices for respectively controlling said coarse moving mechanism, said transfer mechanism and said drive mechanism;

a device for supplying currents to said plurality of tips;

detectors for detecting the currents supplied to said plurality of tips;

a control device for allowing target values of the currents supplied to said plurality of tips to coincide with detected values; and a pattern input device for supplying a target value corresponding to an electron-exposure pattern to said control device for controlling said drive mechanism;

wherein said first holders are springs and said plurality of tips are arranged in a row at predetermined intervals;

said two tips at respective ends of said plurality of tips are used to control distances between said plurality of tips and said conductive layer or conductive substrate, and other tips of said plurality of tips are used for electron exposure on said resist layer;

said plurality of first holders are bent or deformed and said plurality of tips are held in contact with said resist layer due to a Coulomb force which acts between said plurality of tips and said conductive layer or conductive substrate by a voltage applied to create a latent image in said resist layer;

said wafer is relatively moved with said plurality of tips by said drive mechanism while holding said plurality of tips in contact with said resist layer, said plurality of tips are approached to said resist layer by controlling the distance between said plurality of tips and said resist layer by using said two tips at respective ends of said plurality of tips, and the latent image is formed within said resist layer by flowing a constant exposure current in said resist layer by applying a voltage between said conductive layer or said conductive substrate and said plurality of tips.

19. A fabrication apparatus, comprising:

an electrically conductive tip, a first holder, which is used as a spring, for holding said tip;

a moving mechanism for a substrate holder on which a substrate having a resist layer thereon is held, wherein said first holder and said moving mechanism are placed so that the top of said tip and said resist layer are placed to oppose each other;

a second holder for holding said substrate; and a device for supplying exposure current from said tip to said resist layer by supplying voltage between said second holder and said tip, wherein said first holder is deformed by a Coulomb force produced by said voltage, and said substrate is relatively moved with said tip along an X-Y surface of said substrate while holding said tip in contact with said resist layer on said substrate.

20. A fabrication apparatus according to claim 19, wherein when said tip is being approached to said resist layer on said substrate, a latent image in said resist layer is being formed.

21. A fabrication apparatus according to claim 19, wherein currents supplied to said tip used for electron exposure are set to values different from one another at a latent-image creation portion and a latent-image non-creation portion.

* * * * *